H. W. MERRILL & J. W. HOITT.

TIPS FOR BOOTS AND SHOES.

No. 6,762. Reissued Nov. 23, 1875.

Witnesses.

L. H. Latimer,

W. G. Pratt.

Inventors

Hollis W. Merrill and James W. Hoitt per Crosby & Gregory Attys

N. PETERS, PHOTO-LITHOGRAPHER, WASHINGTON, D. C.

BEST AVAILABLE COPY

UNITED STATES PATENT OFFICE.

HOLLIS W. MERRILL AND JAMES W. HOITT, OF LYNN, MASSACHUSETTS, ASSIGNORS TO THE NATIONAL BOOT AND SHOE TIP COMPANY OF CONNECTICUT.

IMPROVEMENT IN TIPS FOR BOOTS AND SHOES.

Specification forming part of Letters Patent No. 160,835, dated March 16, 1875; reissue No. 6,762, dated November 23, 1875; application filed November 18, 1875.

*To all whom it may concern:*

Be it known that we, HOLLIS W. MERRILL and JAMES W. HOITT, both of Lynn, in the county of Essex and State of Massachusetts, have invented a certain new and useful Improvement in Boot and Shoe Tips, of which the following is a full, clear, and exact description, reference being had to the annexed drawing forming a part of this specification, and in which—

Figure 1:
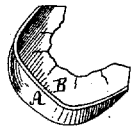
Figure 2:
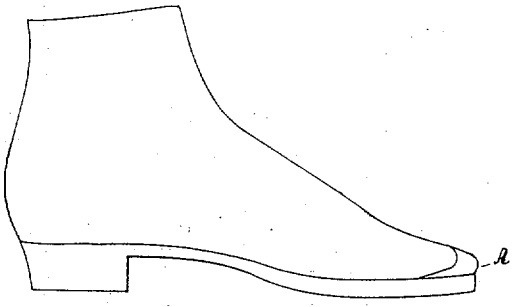

Figure 1 represents a perspective view of this improved tip, and Fig. 2 a view of a shoe with a tip applied.

This invention relates to a tip or protector for the toes of the uppers of boots and shoes; and the invention consists in a tip or protector of prepared rawhide, dyed to render it of a deep permanent color throughout its entire substance, whereby it presents at all times a neat appearance, and is not readily distinguished from the upper of the boot or shoe; also, in such dyed rawhide as an article of manufacture.

The tip presents a lip or ledge, A, of a semicircular or other suitable outline, which shall best adapt it to the form of the toe of the boot or shoe to which it is to be applied, and so as to shield or cover the toe of the upper more or less, as required. B is a base or flange, continuous with the tip, and constituting part thereof. The particular form and size of this base or flange is not material, so long as it is sufficiently large to be intercepted and secured by the stitching or fastenings by which the tip is fastened to the shoe or boot.

In the process of manufacture of these rawhide tips the hides are subjected to the action of a dye-liquor. The process used to dye such rawhide, the color in this instance being black, is as follows: The hide is unhaired and unfleshed in the usual way, and then returned to the lime-vat for a short time to harden and assist in coloring. The hides are then soaked or run through a lukewarm solution of common logwood-liquor, which is made by simply boiling about one bushel of logwood chips, contained in a bag, for about two hours in one barrel of water, to extract the coloring matter. To this is added a handful of bichromate of potash, which must have been previously thoroughly dissolved, this forming the first or preparing liquor, in which the skins are frequently turned for about one day. A dye-liquor is then formed, in which the hides are soaked, in the following manner: First, place iron chips in, and allow them to remain in, a barrel or other suitable quantity of cider or other vinegar until the vinegar has eaten up and become saturated with the iron, this requiring about a month to produce the best results. Then take about one gallon of hot logwood-liquor and add to it about one pound each of powdered nutgalls and blue vitriol, stirring them until dissolved, and to this last solution add about one gallon of the vinegar and iron. In a vat containing about one-half barrel of the logwood-liquor, and capable of covering and treating about two hides, add about four quarts of the mixture containing logwood-liquor, blue vitriol, vinegar, and iron, and allow the hides to remain in the dyeing-liquor three or four days, frequently turning the hides, at the end of which time they will be well blackened throughout, when they are stretched out and dried, and afterward polished, when they will be ready for use.

This treatment results in making the hide of a deep and permanent color (black being preferable) throughout its substance, gives it increased durability and neatness of appearance, and also renders it better capable of resisting the ordinary effects of moisture.

After being removed from the dye-vat the hide is partially or wholly dried, polished, and cut into tip-forming pieces of appropriate shape. These pieces are then softened by soaking, and while yet in a plastic or pliable state are placed in a die, and formed or molded and finished into a perfect and complete tip, as shown in Fig. 1 of the drawing. At this time, or at a previous or subsequent stage of the process, the tip or hide may be treated with a suitable waterproofing material, which shall render it impervious to moisture; but it is found, in the practical tests to which the tips have been subjected, that rawhide in the hard state in which it remains after the treatment above described absorbs moisture very slowly, and that further waterproofing is hardly ever necessary.

A rawhide tip produced as described may be applied to a boot or shoe as are the ordinary tips. It may, however, be remarked that this tip may be applied to a turned boot or shoe in the process of manufacture of the latter, as such tips, while in a plastic state, may be readily turned with a boot or shoe. In this instance it is simply introduced and secured between the upper and outsole.

This rawhide tip possesses several prominent advantages over others in use. First, it can be manufactured at exceedingly low cost. Second, it does not grow rusty or become discolored by wear, but retains its original neat appearance until quite worn out, and for this reason avoids the unsightliness of a metallic tip, while being practically as durable. Third, it is or may be rendered water-proof, so that moisture will effect no unfavorable change in it.

We claim—

1. A boot or shoe tip composed of rawhide permeated with a suitable color, substantially as and for the purpose specified.

2. As a new article of manufacture, prepared rawhide, thoroughly permeated with a suitable coloring material, substantially as herein described.

3. A rawhide shoe-tip dyed black throughout its substance, and molded or formed to present an upwardly-projecting lip to guard the toe of the upper, and an inwardly-bent horizontal flange, adapted to extend between the upper and outsole to receive fastenings adapted to confine the upper, tip, and outsole, substantially as herein described.

HOLLIS W. MERRILL.
JAMES W. HOITT.

Witnesses:
D. K. CROSS,
GEO. J. CARR.